United States Patent
Davidson

(10) Patent No.: US 6,902,044 B2
(45) Date of Patent: Jun. 7, 2005

(54) DISC PAD ASSEMBLY WITHOUT BACKING PLATE

(75) Inventor: Donald J. Davidson, Washington, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 18 days.

(21) Appl. No.: 10/272,084

(22) Filed: Oct. 15, 2002

(65) Prior Publication Data

US 2004/0069579 A1 Apr. 15, 2004

(51) Int. Cl.$^7$ .............................................. F16D 69/00
(52) U.S. Cl. ............................. 188/250 G; 188/250 H; 188/250 F
(58) Field of Search ........................... 188/245, 250 R, 188/251 R, 252, 253, 254, 255, 256, 257, 258, 250 H, 250 D, 250 F, 250 G, 250 B

(56) References Cited

U.S. PATENT DOCUMENTS

| | | | | | |
|---|---|---|---|---|---|
| 1,905,575 | A | * | 4/1933 | Sutherland | 188/258 |
| 2,684,133 | A | * | 7/1954 | Chester, Sr. | 188/244 |
| 3,477,551 | A | * | 11/1969 | Teves | 188/250 B |
| 3,991,860 | A | * | 11/1976 | Clemmons | 188/73.32 |
| 4,276,969 | A | * | 7/1981 | Chin et al. | 188/218 XL |
| 4,279,333 | A | * | 7/1981 | Crossman et al. | 188/218 XL |
| 5,255,762 | A | * | 10/1993 | Beri | 188/250 G |
| 5,377,792 | A | * | 1/1995 | Idesawa | 188/264 G |
| 5,407,031 | A | * | 4/1995 | Christie | 188/29 |
| 5,413,194 | A | * | 5/1995 | Kulis, Jr. et al. | 188/251 A |
| 5,469,942 | A | * | 11/1995 | Krumm, Sr. | 188/250 G |
| 5,474,159 | A | * | 12/1995 | Soennecken et al. | 188/251 A |
| 5,558,186 | A | * | 9/1996 | Hyde et al. | 188/218 XL |
| 6,131,706 | A | * | 10/2000 | Gotti et al. | 188/72.4 |
| 6,267,206 | B1 | * | 7/2001 | Grimme et al. | 188/73.1 |
| 6,283,258 | B1 | * | 9/2001 | Chen et al. | 188/250 E |
| 6,536,695 | B2 | * | 3/2003 | Takasaka | 242/355.1 |

* cited by examiner

Primary Examiner—Robert A. Siconolfi
Assistant Examiner—Devon Kramer
(74) Attorney, Agent, or Firm—Carlson, Gaskey & Olds

(57) ABSTRACT

A disc brake assembly includes a brake pad support member including a wall forming an aperture. A pad is at least partially disposed in the aperture. The pad is constructed from a friction material defining a front friction face and a back face opposite the front face. A perimeter is arranged between the faces. An insert is embedded the pad between the faces and preferably extends to the perimeter adjacent to the wall with the insert receiving the lateral load during braking. Preferably, the insert extends to the back face with a terminal portion of the insert flush with the back face for receiving a brake actuation load. The insert includes a protrusion that locates the insert relative to the friction material during the disc pad forming process. The brake actuator is supported by the brake pad support member for exerting a brake actuation load on the back face of the brake pad, preferably on the insert. If desired, a load plate may be arranged between the brake and the actuator, or the disc brake assembly and pad may be designed such that a piston engages the pad where the brake actuation load may be exerted on the insert.

14 Claims, 3 Drawing Sheets

DISC PAD ASSEMBLY WITHOUT BACKING PLATE

BACKGROUND OF THE INVENTION

This invention relates to a disc brake assembly, and more particularly, the invention relates to a disc pad for a disc brake assembly without a conventional disc pad backing plate.

Disc brake assemblies are widely used in the automotive and commercial trucking industries. A pair of disc pads are arranged on either side of the annular surfaces of a brake rotor. Application of a brake actuator forces friction linings on the disc pad into engagement with the annular surfaces thereby slowing the rotation of the brake rotor and braking in the vehicle. Rotation of the brake rotor during braking introduces lateral loads on the perimeter of disc pad. The disc pad must withstand a brake actuation load and these lateral loads on its perimeter during braking.

Conventional disc pads typically employ a friction material that is riveted or molded to a steel backing plate. The friction material wears up to the rivets at which point the disc pad must be discarded. The backing plate is a rather large piece of steel designed to take the lateral loads and brake actuation loads. The backing plate, which is a significant cost of the disc pad, is discarded once the friction material has worn away. Some disc brake assemblies incorporate a load plate between the backing plate of one disc pad and the brake actuator, rendering the large backing plate some what unnecessary. The disc pad opposite the disc pad that is in engagement with the load plate typically abuts a support member such as a caliper or saddle, also renderings the large backing plate rather unnecessary. Therefore, what is needed is a disc pad that eliminates the large costly backing plate while withstanding brake actuation and lateral loads.

SUMMARY OF THE INVENTION AND ADVANTAGES

The present invention provides a disc brake assembly including a brake pad support member having a wall forming an aperture. A disc pad is at least partially disposed in the aperture. The disc pad is constructed from a friction material defining a front friction face and a back face opposite the front face. A perimeter is arranged between the faces. An insert is embedded in the pad between the faces: and preferably extends to the perimeter adjacent to the wall. The insert receives the lateral load during braking. Preferably, the insert extends to the back face with a terminal portion of the insert flush with the back face for receiving a brake actuation load. The insert includes a protrusion that locates the insert relative to the friction material during the disc pad forming process. The brake actuator is supported by the brake pad support member for exerting a brake actuation load on the back face of the disc pad, preferably on the insert. If desired, a load plate may be arranged between the disc pad and the actuator, or the disc brake assembly and disc pad may be designed such that a piston engages the disc pad where the brake actuation load may be exerted on the insert.

Accordingly, the above invention provides a disc pad that eliminates the large costly backing plate while withstanding brake actuation and lateral loads.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
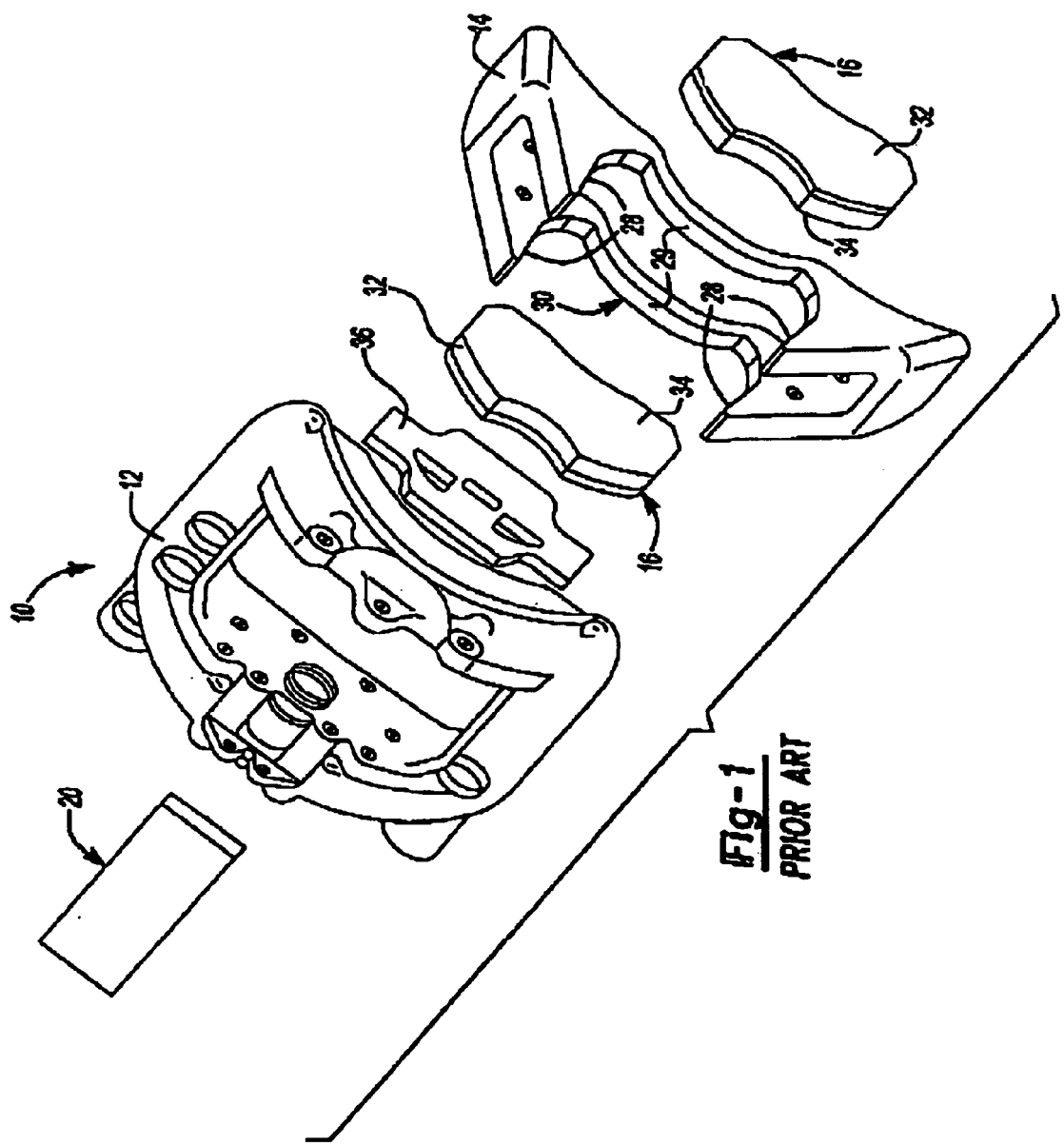
FIG. 1 is an exploded perspective view of a prior art disc brake assembly.
Figure 2:
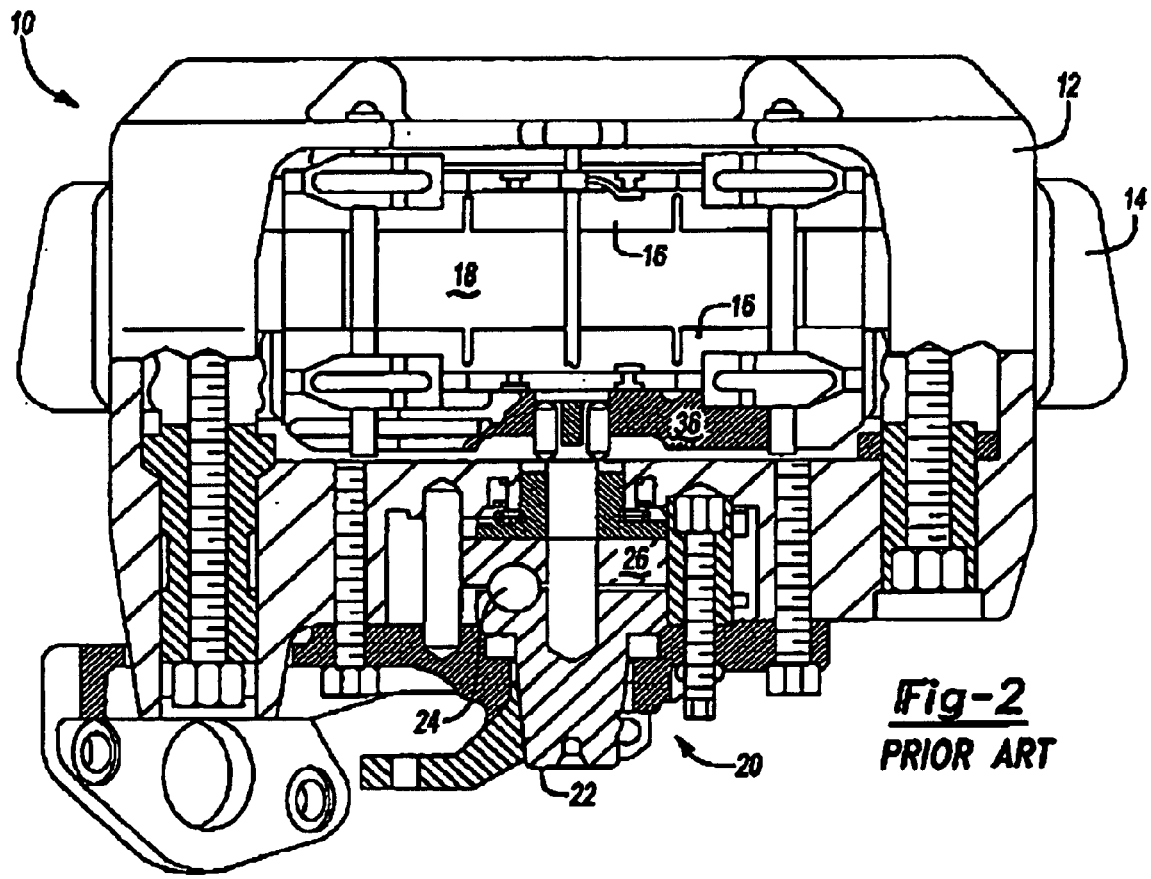
FIG. 2 is a cross-sectional view of prior art disc brake assembly.

An exploded portion of a disc brake assembly 10 is shown in FIG. 1 and in cross-section in FIG. 2. The assembly 10 includes a brake pad support member that may include a caliper 12 with a saddle 14 supported by the caliper 12, typically with pins. Disc pads 16 are supported by the saddle 14 on either side of a rotor 18. A brake actuator 20 is shown schematically in FIG. 1, and is supported by the caliper 12. The brake actuator 20 produces a brake actuation load on the disc pads 16, typically through a load plate 36 arranged between the brake actuator 20 and one of the disc pads 16. A portion of a typical brake actuator 20 is best shown in FIG. 2. The actuator 20 shown in FIG. 2 includes a shaft 22 with a ball 24 arranged between the shaft 22 and a ramp 26. Rotation of the shaft 22 moves the ramp structure 26 axially forcing the disc pads 16 into engagement with the rotor 18.

The saddle 14 includes walls 28 and 29 defining an aperture 30 for supporting each of the disc pads 16. Prior art disk pads typically include a steel backing plate 32 riveted or molded to friction material 34. The steel backing plates 32 take the brake actuation load and the lateral load produced between the backing plate 32 and the walls 28 and 29 as the rotor 18 grabs the friction surface 34 during braking. The rotor encourages the disc pad 16 to spin and the side walls take the lateral load. The wall 29 takes the load from the disc pad 16 caused by vibrations from the road. The back surface of the disc pad 16 opposite the actuator 20 and load plate 36 is typically supported by an inner surface of the caliper 12 during braking.

Figure 3:
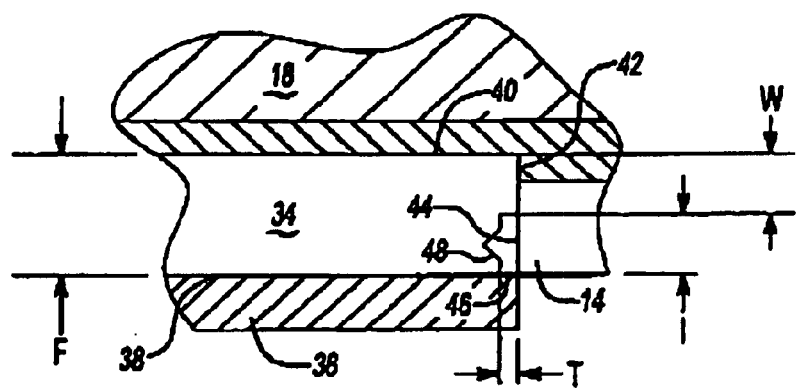
FIG. 3 is an enlarged cross-sectional view of the present invention disc brake assembly with disc pad.

The present invention eliminates the large steel backing plate 32 that are discarded when the disc pads have worn. Instead the present invention disk pads utilize an insert 44, shown in FIG. 3, to take the brake actuation load and lateral load. The disc pad 16 includes a back face 38 that is typically in engagement with a load plate 36, a brake actuation piston, or component or a brake pad support structure such as an inner surface of the caliper 12. A front friction face 40 is spaced from the back face 38 and engages the rotor 18 during braking. The disc pad 16 also includes a perimeter 42 arranged between the faces 38 and 40. A portion of the perimeter 42 is adjacent to the walls 28 and 29 to laterally locate the disc pad 16. An insert 44 is embedded in the friction material between the faces 38 and 40, and provides the structural integrity for the disc pad 16. The insert 44 also preferably extends to the perimeter adjacent to the wall for receiving the lateral load during braking. Preferably, the insert 44 also extends to the back face with a terminal portion 46 of the insert flush with the back face 38 for receiving the brake actuation load. In this manner, the insert 44 receives the loading to which the disc pad 16 is subjected during normal braking.

The insert includes a protrusion 48 or locating feature that extends inwardly away from the perimeter 42 to locate the insert 44 relative to the friction material 34. The insert 44 defines at least a portion of the outer surface of the disc pad such as the perimeter 42 or the back face 38. The friction material is molded about the insert to surround the locating feature. The wearable portion W of the disc pad is defined by the thickness of the friction material F minus the thickness I of the insert. The width of the insert T is relatively thin such as approximately 1 millimeter. Of course, it is to be understood that the dimensions of the insert may be determined by the particular loading to which the disc pads will be subjected during brake use.

Figure 4:
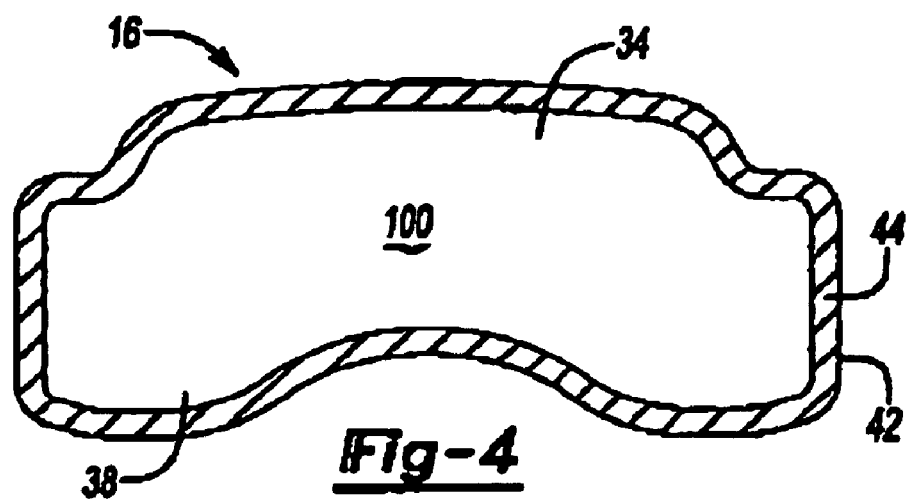
FIG. 4 is a rear view of the back face of the disc pad.
Figure 5:
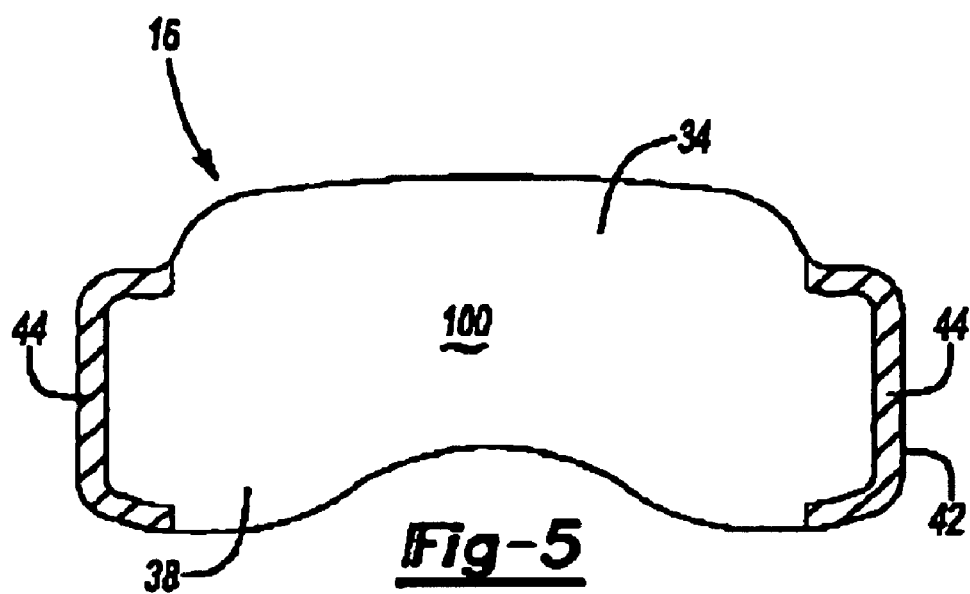
FIG. 5 is a rear view of another disc pad back face.

The insert may be arranged about the entire perimeter of the disc pad, as shown in FIG. 4. Alternatively, multiple inserts may be used and arranged about the disc pad 16 in locations in which it is needed for taking the brake actuation and lateral loads. For example, as shown in FIG. 5, two inserts 44 may be spaced from one another on opposing lateral sides adjacent to opposing lateral sides of the wall 28 for taking the lateral load. It should be understood that any number of inserts 44 may be used and located appropriately for the loading of a particular disc brake assembly configuration. As can be appreciated, the inserts 44 are at the opposing lateral sides, but an area 100 intermediate the opposing lateral sides contains the friction material, and is exposed at the back face 38.

As is also clear from FIGS. 4 and 5, the great bulk of the surface area of the disk pad does not include any of the insert. Rather, the bulk of the surface area of the disc pad is solely the friction material between the forward friction face and a back face.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A disc pad comprising:
    a disc pad body formed of a friction material having a front friction face and a back face, a perimeter defined throughout a thickness between said front friction face and said back face; and
    an insert, said insert having at least portions at opposing lateral sides of said perimeter of said disc pad body, said insert embedded in said friction material, and an open area defined between said portions of said insert such that there is an exposed area of friction material at said back face, and extending between said portions of said insert at said opposing lateral sides, and said insert not being found across said exposed area such that said friction material is formed between said front friction face and said back face across an entirety of said exposed area.

2. The disc pad as set forth in claim 1, wherein said insert extends to said back face with a terminal portion of said insert flush with said back face for receiving a brake actuation load.

3. The disc pad as set forth in claim 1, wherein said insert includes a protrusion extending inwardly away from said perimeter for locating said insert relative to said friction material.

4. The disc pad as set forth in claim 1, wherein said insert surrounds the entire perimeter or said disc pad body, with an opening defined inwardly of said perimeter and providing said exposed area of friction material at said back face.

5. The disc pad as set forth in claim 1, wherein said insert portions are provided by at least two separate insert members, with at least one of said insert members positioned at each of said opposing lateral sides.

6. The disc pad as set forth in claim 1, wherein said insert extending into said thickness of said disc pad body for a portion of said thickness, but ending short of said front friction face, and with said portions of said insert being at a laterally outermost edge of said disc pad body at each of said opposing lateral sides.

7. A disc brake assembly comprising:
    a brake pad support member including a wall forming an aperture;
    a disc pad at least partially disposed in said aperture, said disc pad constructed from friction material, and defining a front friction face and a back face opposite said front friction face with a perimeter extending through a thickness of said disc pad, and between said front friction face and said back face;
    an insert embedded in said disc pad, said insert having portions at opposing lateral sides of said perimeter of said disc pad body, and an exposed area defined between said portions of said insert such that there is an exposed area of friction material at said back face, and extending between said portions of said insert, said insert not being found across said exposed area such that said friction material is formed between said front friction face and said back face across an entirety of said exposed area; and
    a brake actuator supported by said brake support member and exerting a brake actuation load on said back face.

8. The disc brake assembly as set forth in claim 7, wherein said insert extends to said back face with a terminal portion of said insert flush with said back face for receiving a brake actuation load.

9. The disc brake assembly as set forth in claim 7, wherein said insert includes a protrusion extending inwardly away from said perimeter for locating said insert relative to said friction material.

10. The disc brake assembly as set forth in claim 7, wherein said insert surrounds the entire perimeter of said disc pad body, with an opening defined inwardly of said perimeter and providing said exposed area of friction material at said back face.

11. The disc brake assembly as set forth in claim 7, wherein said portions of said insert are provided by at least two separate insert members, with at least one of said insert members positioned at each of said opposing lateral sides.

12. The disc brake assembly as set forth in claim 7, wherein said insert extending into said thickness of said disc pad body for a portion of said thickness, but ending short of said front friction face, with said portions of said insert being at a laterally outermost edge of said disc pad body at each of said opposing lateral sides.

13. The disc brake assembly as set forth in claim 1, wherein a cross-sectional area may be defined in any plane extending generally parallel to said front friction face and said rear face, and said disc pad body having friction material without any of said insert over the majority of said cross-sectional area at all planes between said front friction face and said rear face.

14. The disc brake assembly as set forth in claim 7, wherein a cross-sectional area may be defined in any plane extending generally parallel to said front friction face and said rear face, and said disc pad body having friction material without any of said insert over the majority of said cross-sectional area at all planes between said front friction face and said rear face.

* * * * *